United States Patent [19]

Castor

[11] 4,097,135

[45] Jun. 27, 1978

[54] APPARATUS FOR AUDIO VISUAL PRESENTATION OF MUSIC

[76] Inventor: Richard R. Castor, 164 Roselawn Cres., Fairport, N.Y. 14450

[21] Appl. No.: 758,593

[22] Filed: Jan. 12, 1977

[51] Int. Cl.² .................. G03B 31/04; G09B 15/02
[52] U.S. Cl. ............................... 353/15; 84/470 R; 84/477 R; 352/17; 352/31
[58] Field of Search .................. 353/15, DIG. 2; 40/28.3; 84/470, 477 R, 484; 352/17, 31

[56] References Cited

U.S. PATENT DOCUMENTS

| 2,869,420 | 1/1959 | Thannhauser | 84/484 |
| 3,026,769 | 3/1962 | Thiele et al. | 353/15 |
| 3,028,789 | 4/1962 | Wade | 353/15 |
| 3,028,790 | 4/1962 | Wade et al. | 353/15 |
| 3,187,626 | 6/1965 | Mindell et al. | 352/31 |
| 3,782,811 | 1/1974 | Badalich et al. | 352/17 |
| 3,823,637 | 7/1974 | Scott | 84/477 R |

FOREIGN PATENT DOCUMENTS 2,279,290  2/1976  France ................. 84/470

Primary Examiner—Richard E. Aegerter
Assistant Examiner—Richard R. Stearns
Attorney, Agent, or Firm—Fred L. Denson

[57] ABSTRACT

An audio-visual apparatus is disclosed which includes a projection screen having indicia thereon representative of a note play marker, means for successively projecting onto the screen adjacent the note play marker a plurality of visual images of a musical composition recorded on a film strip, means for providing a sound recording of the musical composition and control means for relating the projection of the visual images with the playing of the sound recording.

5 Claims, 7 Drawing Figures

| | TO READ MUSIC BEATS PER MINUTE | | | | |
|---|---|---|---|---|---|
| SWITCH NO. | 2-4 TIME | 3-4 TIME | 4-4 TIME | 6-8 TIME | HERTZ |
| OFF | 0 | 0 | 0 | 0 | 0 |
| 0 | 120 | 180 | 240 | 360 | 60 |
| 1 | 100 | 150 | 200 | 300 | 50 |
| 2 | 66 | 99 | 132 | 198 | 33 |
| 3 | 60 | 90 | 120 | 180 | 30 |
| 4 | 50 | 75 | 100 | 150 | 25 |
| 5 | 40 | 60 | 80 | 120 | 20 |
| 6 | 33 | 50 | 66 | 99 | 16.5 |
| 7 | 30 | 45 | 60 | 90 | 15 |
| 8 | 20 | 30 | 40 | 60 | 10 |
| 9 | 80 | 120 | 160 | 240 | 40 |
| 10 | AUTOMATIC | | STOP | | 150 |

APPARATUS FOR AUDIO VISUAL PRESENTATION OF MUSIC

CROSS REFERENCE TO RELATED APPLICATIONS

Reference is made to U.S. Ser. No. 758,578 entitled "Methods of Producing a Visual Record of a Musical Composition", filed concurrently herewith on Jan. 12, 1977 in the name of Richard R. Castor.

BACKGROUND OF THE INVENTION

1. Field of the Invention

The present invention relates to audio-visual apparatus and more particularly, to apparatus for audio-visual presentation of musical compositions.

2. Description of the Prior Art

Audio-visual apparatus, such as sound motion picture projectors, have been used in the instruction of music to present a student musician with a visual image of musical scoring simultaneously with the presentation of a sound recording of the performance of such notation. Heretofore, the use of such apparatus as a teaching aid has been restricted by the high cost of preparing the instructional material utilized in the audio-visual apparatus.

It is therefore an object of the invention to provide an improved apparatus for audio-visual presentation of music.

It is another object of the invention to provide an improved apparatus for audio-visual presentation of music which may be performed by a musician or group of musicians.

Yet another object of the invention is to provide an improved apparatus for audio visual presentation of music for educational or entertainment purposes.

An additional object of the invention is to provide an improved apparatus for audio-visual presentation of music which utilizes inexpensively prepared program material.

Still another object of the invention is to provide an improved apparatus for audio-visual presentation of music that indicates the period of time the musician is to play or hold the notes of the presented musical composition.

SUMMARY OF THE INVENTION

These and other objects are accomplished in accordance with the invention by an audio-visual apparatus comprising a projection screen having indicia thereon representative of at least one musical cleft designation and a note play marker, a projector for successively projecting in a superimposed relationship with the note play marker of the screen a plurality of visual images of musical notation, a tape recorder for providing a sound recording of the performance of such musical notation and a control mechanism for relating the projection of the visual images with the playing of the sound recording. To utilize the apparatus of the invention, the scoring for a musical composition is recorded on a filmstrip in a manner such that the musical measures of such composition are of equal length and the individual musical notes are spaced within such measures according to their musical beat value. A plurality of synchronizing signals are recorded on one channel of a two channel tape that are representative of a desired musical tempo. The tape is then transported through the tape recorder and the synchronizing signals are detected and utilized to control the advancement of the aforementioned filmstrip through the projector while a musical performance of the scored musical notation is projected on the screen, performed and the performance simultaneously recorded on the other channel of the tape. The apparatus is then prepared for an audio-visual presentation of the musical composition by returning both the tape and the filmstrip to their start positions. A replaceable mask having indicia of the various musical instruments used in the recorded performance of the musical composition together with cleft designations is positioned adjacent the screen. Upon activation of the audio-visual apparatus, the tape is transported through the recorder which produces a first output in accordance with the recorded musical composition and a second output in accordance with the synchronizing signals. The first output is used to drive a speaker and the second output is used to activate the mechanism which controls the advancement of the filmstrip through the projector.

One advantage of the present invention is that it enables a musician or group of musicians to play along with a sound recording of a "lead" name or musical group. Another advantage of the invention for people participating in group instrumental activities is that it eliminates the problems related to the acquisition and maintenance of a large quantity of sheet music. As a teaching device, it eliminates the need for a metronome or other music timing device in that the transport mechanism advances the film at the designated musical speed.

The invention, its objects and advantages will become more apparent to those skilled in the art by referring to the accompanying drawings wherein like reference numerals denote like parts and to the ensuing detailed description of the preferred embodiment.

DETAILED DESCRIPTION OF THE PREFERRED EMBODIMENT

Figure 1:
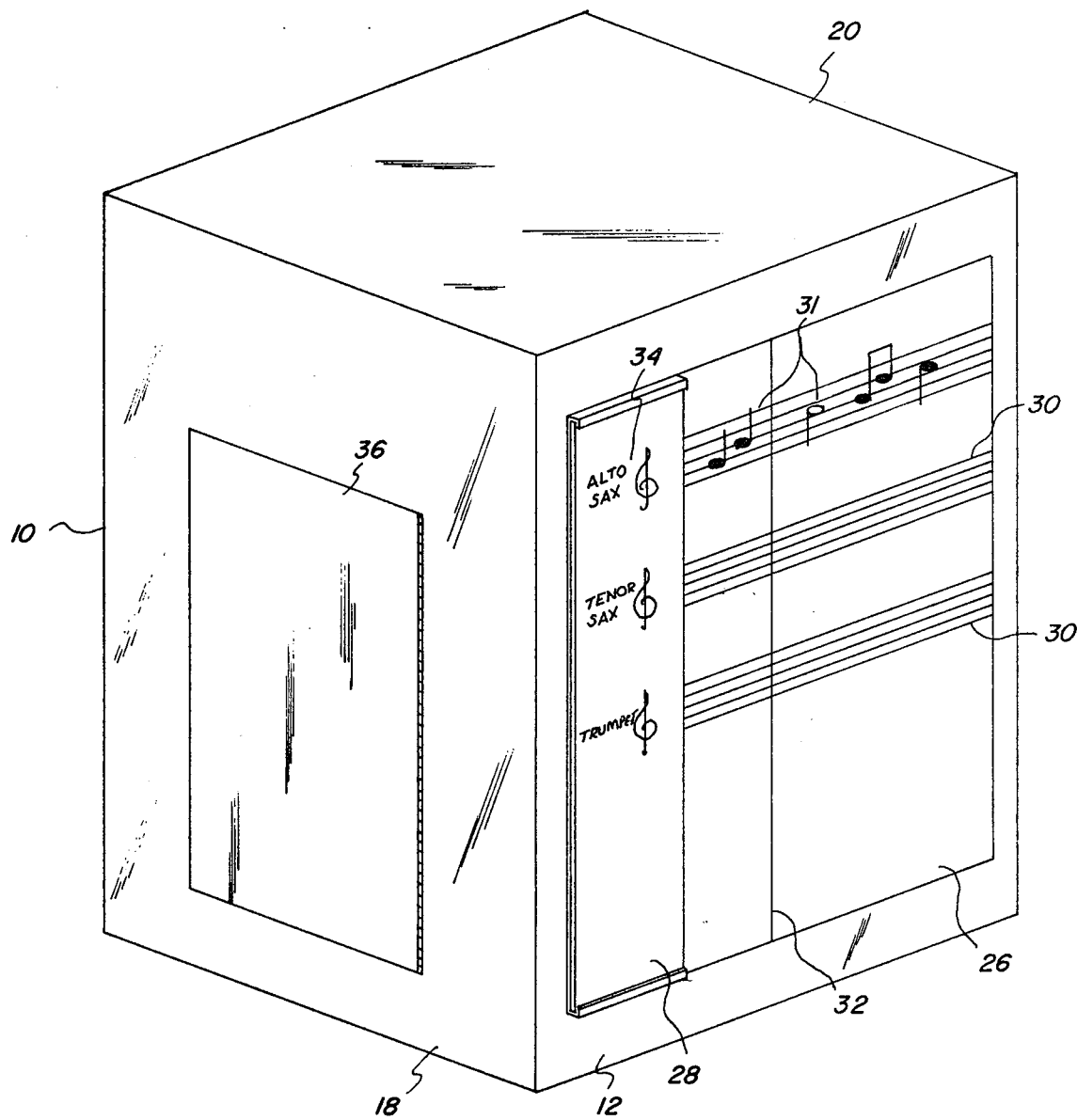
FIG. 1 is a perspective view of an illustrative audio-visual apparatus constructed in accordance with the teachings of the invention.
Figure 2:
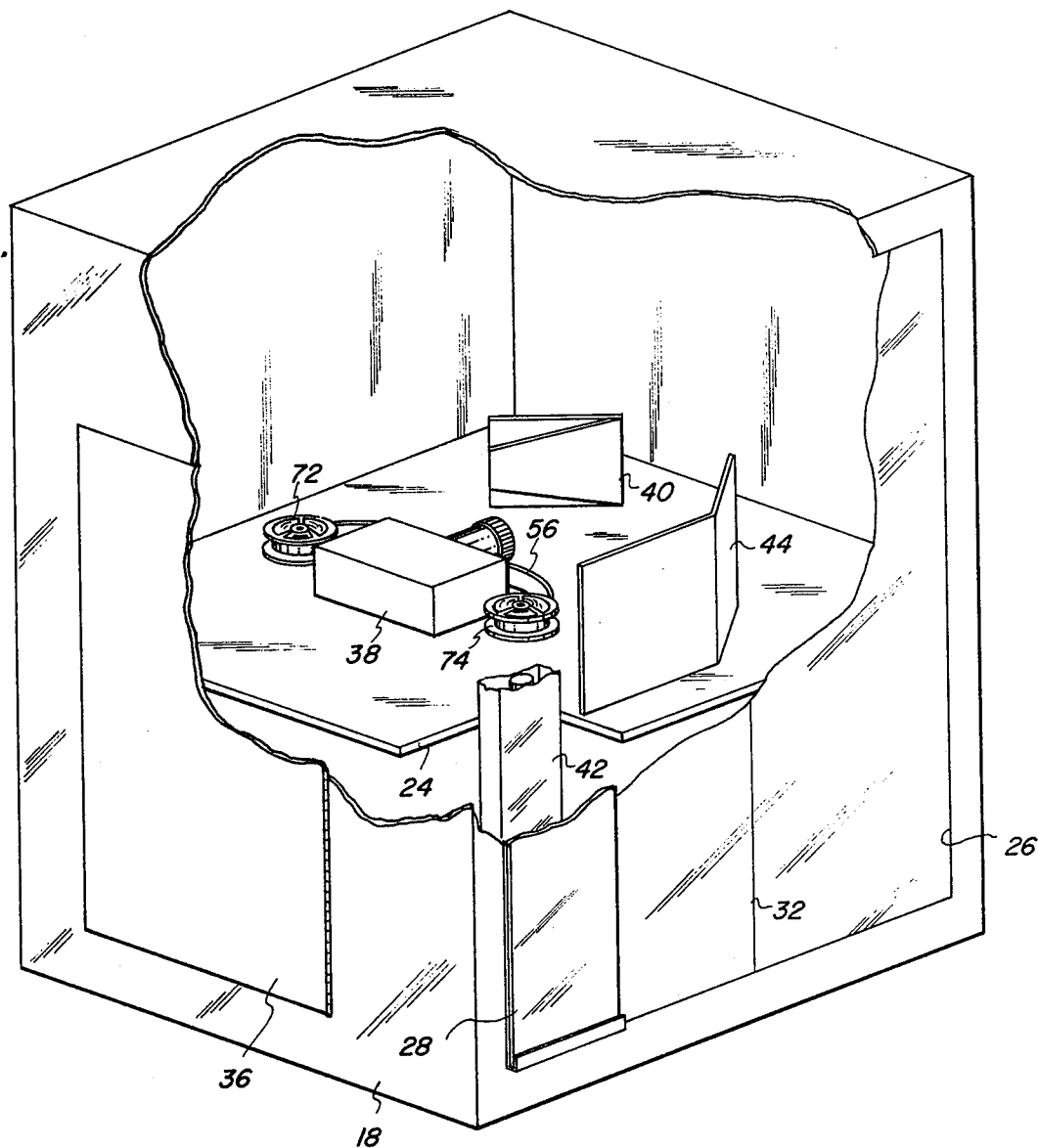
FIG. 2 is a perspective view of the apparatus with a portion broken away to show the arrangement of components on a top shelf thereof.
Figure 3:
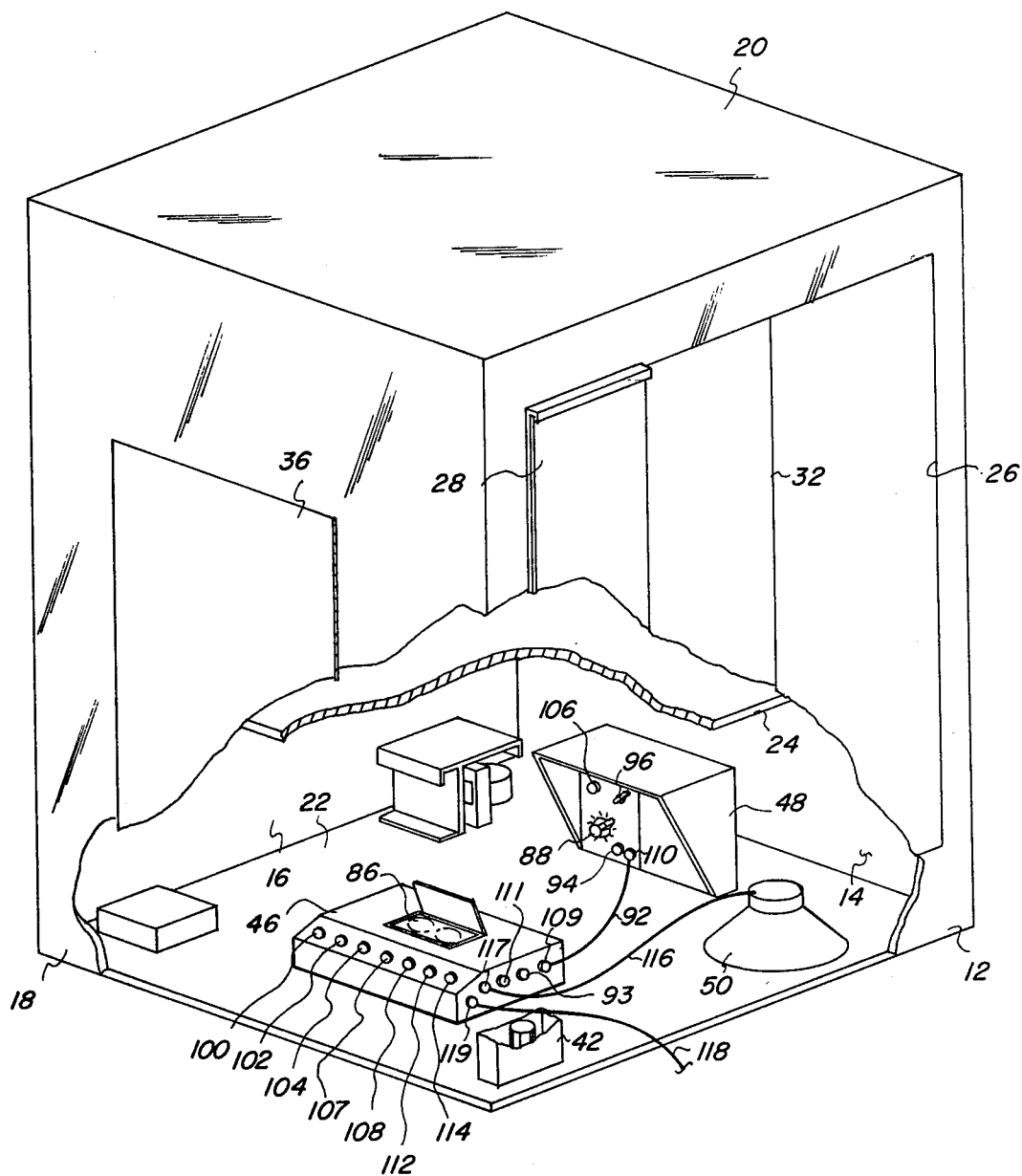
FIG. 3 is a perspective view of the apparatus with a portion broken away to show the arrangement of components on a lower shelf thereof.

Referring now to the drawings, and in particular to FIGS. 1–3, an illustrative embodiment of the present invention is shown to include a cabinet 10 having four sidewalls 12, 14, 16 and 18, respectively, a top wall 20, a bottom wall 22 and a shelf 24. Sidewall 12 has an opening thereon in which a translucent, rear projection screen 26 and a replaceable instrument mask 28 are mounted. The screen 26 has indicia thereon of a color which contrasts with the screen surface and depicts a plurality of musical staffs 30, notes 31 and a note play marker 32. Similarly, mask 28 has color contrasting indicia 34 thereon aligned with the musical staff indicia of the screen 26 which depict a plurality of different musical instruments.

A door 36 in cabinet sidewall 18 permits access to the interior of the cabinet 10. The mounting arrangement of the cabinet's interior components is shown in FIGS. 2 and 3. On the shelf 24, a filmstrip projector 38 and a mirror 40 are arranged as shown in FIG. 2 to project images recorded on a filmstrip 56 (see FIG. 4) onto the screen 26. Mounted on the sidewall 12 behind the instrument mask 28 is a light box 42 which illuminates the mask 28. A light shield 44 is mounted on the shelf 24 between the light box 42 and the projector 38 to prevent the light emanating from the light box 42 from washing out the images projected onto the screen 26 by the projector 38. On the bottom wall 22, a stereo or two channel tape recorder 46, a control box 48 and an audio speaker 50 are arranged as shown in FIG. 3.

Figures 4, 5:
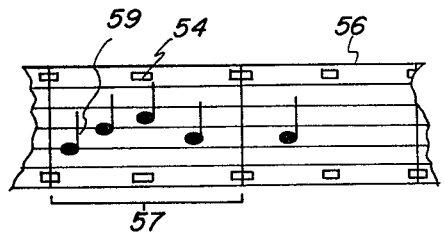
FIG. 4 is a fragmentary view of a portion of the filmstrip utilized in the apparatus.
FIG. 5 is an enlarged front elevational view of the control box of the apparatus.
Figure 6:
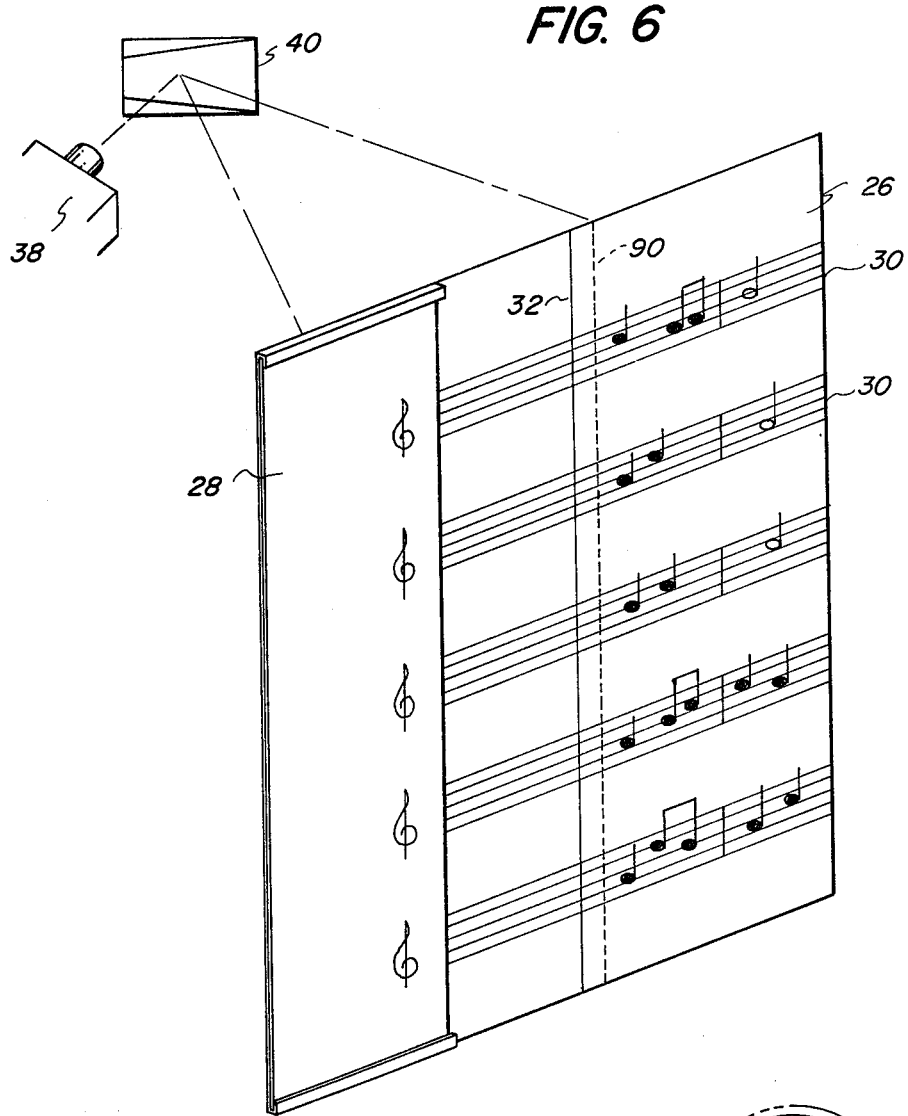
FIG. 6 is a side elevational view of the projection screen and replaceable instrument mask.

Referring now to FIG. 4, the musical scoring to be visually displayed on the screen 26 by the projector 38 is recorded onto a filmstrip 56 so that each musical measure 57 of such scoring is of equal length and each note 59 is positioned within a measure according to the musical time (such as 2-4, 3-4, 4-4, 6-8 time) in which the composition is scored. In a preferred embodiment of the invention, the filmstrip 56 comprises a length of 35 mm film and each measure recorded on the filmstrip is approximately 0.375 inches in length, such length being equal to twice the distance between centerlines of two adjacent filmstrip sprocket holes 54. Utilizing a 0.375 inch measure length the proper spatial positioning of individual notes within a measure 57 can be illustrated by the following examples. If the musical notation recorded on the filmstrip 56 is to be played in 4-4 time, four quarter notes can be located within the measure 57 at the following positions: (1.) the first quarter note at the beginning of the measure; (2.) the second quarter note 0.094 inches from the start of the measure; (3.) the third quarter note 0.188 inches from the start of the measure; and (4.) the fourth quarter note 0.282 inches from the start of the measure. Ultimately, two quarter notes and one half note can be treated within the measure 57 at the following positions: (1.) the first quarter note at the beginning of the measure; (2.) the second quarter note 0.094 inches from the start of the measure and (3.) the half note 0.188 inches from the start of the measure. Still another permissible combination within the measure 57 is two eighth notes, one quarter note and one half note treated at the following positions: (1.) the first eighth note at the beginning of the measure; (2.) the second eighth note 0.047 inches from the start of the measure; (3.) the quarter note 0.094 inches from the start of the measure; and (4.) the half note 0.188 inches from the start of the measure. If the musical notation recorded on the filmstrip 56 is to be played in 3-4 or 6-8 time, then three quarter notes can be located within a measure 57 at the following positions: (1.) the first quarter note at the beginning of the measure; (2.) the second quarter note 0.125 inches from the start of the measure; and (3.) the third quarter note 0.250 inches from the start of a measure. If the musical notation recorded on the filmstrip 56 is to be played in 2-4 time, two quarter notes can be located within a measure 57 at the following positions: (1.) the first quarter note at the beginning of the measure and (2.) the second quarter note 0.188 inches therefrom.

In practice, the first note of the measure is usually not positioned precisely at the beginning of the measure since the measure bar occupies this position. Therefore, it is preferred to position the first note a small distance to the right of the measure bar but to retain the aforementioned spatial relationship between notes as previously described.

Figure 7:
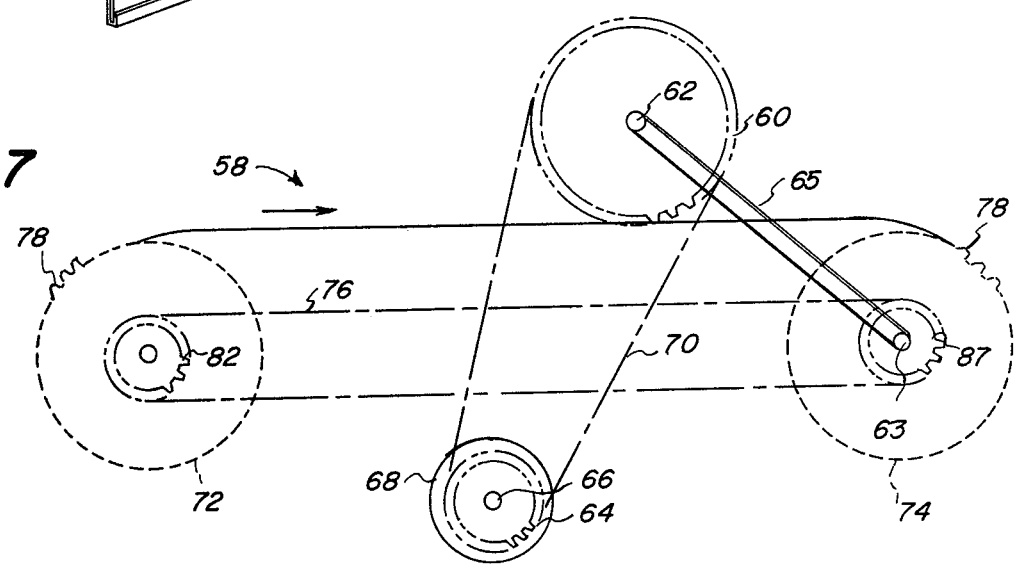
FIG. 7 is a top plan view of the projector filmsrip advance mechanism.

The filmstrip 56 is advanced through the filmgate of the projector 38 by a filmstrip advance mechanism 58 best shown in FIG. 7. The advance mechanism 58 generally comprises a D.C. stepping advance motor 68 which is interconnected to a rotatable projector shaft 62 by a linkage and sprocket arrangement as described in detail hereinbelow. Each electrical input pulse received by the motor 68 produces an angular rotation of a motor shaft 66 of 1.8°. This rotational movement of the motor shaft 66 is transmitted to the projector shaft 62 via an endless drive belt 70 which is entrained around motor pulley 64 mounted on the shaft 62. The rotational movement of the projector shaft 62 is in turn transmitted to a film take up spool 74 and a film supply spool 72 via a first endless drive belt 65 entrained around an extension of projector shaft 62 and an extension of the take up spool shaft 63 and a second endless drive belt 76 entrained around the two spool pulleys 82 and 87 respectively.

The spools 72 and 74 each have 16 sprocket teeth 78 which are adapted to engage the sprocket holes 54 in the filmstrip 56. Transportation of each measure 57 recorded on the filmstrip 56 past the note play marker 32 on the screen 26 requires the sprocket teeth 78 to engage two successive sprocket holes 54 in the filmstrip 56 which in turn requires 45° of rotational movement by the spools 72 and 74. Transportation of each measure 57 past the note play marker 32 in only two filmstrip movements results in a jerky movement of the notes 59 which is difficult for the viewing musician to follow. To provide a filmstrip transportation movement which appears to the viewing musician to be more smooth and continuous, it is desirable to move the spools 72 and 74 a plurality of times between each engagement of a sprocket tooth 78 with a sprocket hole 54 in the filmstrip 56. In the illustrative filmstrip advance mechanism 58 shown in FIG. 7, the spools 72 and 74 move 12 times per measure 57 or six times per sprocket hole 54, thus each movement of the spools 72 and 74 requires only 3.75° of rotation. The 12 spool moves per measure are achieved by providing 30 teeth on the motor pulley 64 and 72 teeth on the projector pulley 60. This gearing ratio produces 9° of rotation by the motor shaft 66 (the rotation produced by the receipt of five input pulses) for each 3.75° of rotation of the projector shaft 62. As will be obvious to those skilled in the art, a different number of spool moves per measure can be achieved by appropriate selection of the number of teeth on the pulleys 60 and 64.

The input pulses supplied to the motor 68 are derived from a plurality of synchronizing signals recorded on one channel of a two channel program tape 86 carried by the stereo tape recorder 46. The synchronizing signals are recorded on the tape 86 at predetermined intervals which are representative of a desired musical tempo i.e. a desired number of musical beats per minute. By varying the recording interval, synchronizing signals can be recorded on the tape 86 which are representative of a variety of different musical tempos. One means of varying the recording interval of the synchronizing signals is to vary the frequency of such signals. The master control box 48 includes a multiple output oscillator (not shown) which selectively provides output signals of 10, 15, 16.5, 20, 30, 40, 50 and 60 Hertz. As shown by the chart in FIG. 5, this combination of outputs can be used to record synchronizing signals on the tape 86 which are representative of a variety of musical tempos (i.e. musical beats per minute) for musical compositions played in 2-4, 3-4, 4-4 and 6-8 time. For example, location of the switch 88 in the "0" switch position produces an oscillator output signal of 60 Hertz. Recording of a 60 Hertz synchronizing pulse on the tape 86 will result in the production of 60 input pulses per second to the motor 68. In response to this input, the motor 68 will rotate the motor shaft 66 at a rate of 60 moves per second and this rotation will be transmitted to the projector shaft 62 via the pulleys 60 and 64 and the drive belt 70 at a rate of 12 moves per second. Movement of the filmstrip 56 at a rate of 12 moves per second will transport 60 measures per minute past the note play marker 32 which is representative of a tempo of 120 beats per minute in 2-4 time (two beats per measure × 60 measures per minute), 180 beats per minute in 3-4 time, 240 beats per minute in 4-4 time or 360 beats per minute in 6-8 time. The control box oscillator also provides a 150 Hertz output signal which is used to stop the advancement of the filmstrip 56 through the projector 38, for example, to provide still projection of a single filmstrip image positioned between two musical presentations. This single filmstrip image, commonly termed a "stuffer", may contain an advertising message, information regarding the next musical composition, or other desired graphic information and may be accompanied by audio information recorded in the program channel of the tape 86. The chart in FIG. 5 lists all of the available oscillator outputs, the positions of the switch 88 which produce these outputs and the number of beats per minute which each output is representative of in 2-4, 3-4, 4-4 and 6-8 time.

To record synchronizing pulses on the tape 86, a sync cord 92 is plugged into the record jack 94 on the control box 48 and into the sync record jack 93 on the tape recorder 46. A switch 96 on the control box 48 is moved to the center switch position 98 and the switch 88 is rotated to the switch position providing the desired musical tempo. Recording is accomplished by holding the sync mode control button 100 on the tape recorder 46 down while depressing the recorder play button 102. When the desired length of tape 86 has synchronizing pulses recorded thereon, the pause button 104 on the recorder 46 is depressed and the switch 88 rotated to switch position 10 so that a 150 Hertz stop signal is recorded on the tape 86. The pause button 104 is then released, the stop record button 106 on the control box 48 momentarily depressed and finally, the stop button 108 on the recorder 46 depressed.

Upon completion of the recording of synchronizing signals representative of a desired musical tempo onto one channel of the tape 86, the apparatus is prepared for recording music on the other channel of the tape 86 by transferring the sync cord 92 into the sync output jack 109 on the recorder 46 and into the play jack 110 on the control box 48 and plugging the tape recorder microphone (not shown) into the microphone jack 111. The tape 86 is reversed to its starting position by depressing the recorder rewind button 112 and a filmstrip 56 is placed on the supply spool 72, the filmstrip leader being manually threaded through the projector filmgate and wound into the take-up spool 74 until a filmstrip starting line 90 is aligned with the note play marker 32. Recording is commenced by holding the button 114 down while depressing the recorder play button 102. As the tape 86 is fed through the recorder 46, the recorder produces an output associated with the synchronizing channel of the tape which is processed by conventional electrical circuitry (not shown) and applied as input pulses to the motor 68. As the images of musical notation recorded on the filmstrip 56 are successively projected onto the screen 26 adjacent the note play marker 32 at a rate determined in accordance with the activation of the motor 68, a musical performance of such notation by one or more musicians is simultaneously recorded on the second channel of the tape 86.

Upon completion of the abovenoted procedures, the audio-visual apparatus of the invention is prepared for presentation to a viewing audience by plugging the speaker cable 116 into the recorder's speaker phone jack 117, plugging a stop cable 118 into the recorder's remote stop jack 119 and placing the master control switch 96 in the forward position 120. Upon depressing the recorder play button 102, the filmstrip 56 will begin moving in sequence and in synchronism with the sound coming from the speaker 50. As the scoring projected on the screen moves from right to left it becomes aligned with the note play marker at which time the musician plays the musical notation for the appropriate period of time. Each musician plays the note sequence set forth on the line of the orchestration scored for his particular instrument.

The apparatus of the invention can be adapted for use with other film formats and with other types of stereo sound recording apparatus. More specifically, a movie film or a video tape recording can be produced from the visual image displayed on the projection screen of the apparatus of this invention by photographing or taping with an appropriate camera the entire musical composition. Distribution and utilization of the composition is greatly facilitated by use of such second generation recordings in that the composition can be displayed at the proper tempo with conventional movie projectors or television monitors. Moreover, use of an oscillator apparatus providing a completely variable output allows the recording of synchronizing signals on tape 86 that are representative of any desired musical tempo. Also, a sound recording apparatus having a variable tape drive rate allows an operator of the audio visual unit to adjust the tempo of a musical composition during its presentation to an audience.

The invention has been described in detail with particular reference to a preferred embodiment thereof but it will be understood that variations and modifications can be effected within the spirit and scope of the invention. For example, when more musicians are present than can be accommodated by one audio-visual unit, one or more slave units can be provided. Each slave unit comprises a cabinet 10 containing the video components of the master unit but not the audio components and is controlled in accordance with command synchronization signals produced by the master unit control box 48.

I claim:
1. Apparatus for audio-visual presentation of music comprising in combination:
   a. a projection screen having indicia thereon representative of a note play marker;
   b. a film strip having recorded thereon a musical composition having measures of equal length and notes which are spaced within said measures according to their beat value;

c. a projector having an advance mechanism for successively projecting on said projection screen a plurality of visual images of the musical composition recorded on the filmstrip;

d. a tape recorder;

e. a two channel tape operatively carried by said recorder and including a first channel having a programmed master signal recorded thereon and a second channel having a plurality of synchronizing signals recorded thereon at predetermined intervals which are representative of a desired musical tempo, said tape recorder being constructed and arranged to produce a first output in accordance with said programmed master signal and a second output in accordance with said synchronizing signals;

f. an audio-speaker having its input connected to said first output of said recorder; and g. control means having its input connected to said second output of said recorder and its output connected to said advance mechanism to cause said projector to display successive visual images of said composition in accordance with said synchronizing signals.

2. The apparatus defined in claim 1 wherein said recorder includes means for varying the transport rate of said tape.

3. The apparatus defined in claim 1 wherein said advance mechanism includes a stepping motor having a shaft, a first pulley having a first predetermined number of teeth mounted on said motor shaft, a second pulley having a second predetermined number of teeth operatively associated with said advance mechanism, an endless drive member connecting said first and second pulleys and said control means includes means for receiving said second output of said recorder and for applying activating input pulses to said stepping motor in response thereto.

4. The apparatus defined in claim 1 wherein said filmstrip has a plurality of equally spaced perforations located along at least one edge thereof and said advance mechanism includes two sprocket members which engage said perforations and are advanced in a forward direction at a rate in accordance with said synchronizing signals.

5. The apparatus defined in claim 1 further including a slave unit comprising a projection screen having indicia thereon representative of a note play marker, a film strip having recorded thereon a musical composition having measures of equal length and notes which are spaced within said measures according to their beat value, a projector having an advance mechanism for projecting onto said projection screen a plurality of visual images of the musical composition recorded on the filmstrip and means for synchronizing the movements of said advance mechanism of said slave unit projector and said previously defined projector.

* * * * *